United States Patent
Ohashi et al.

(10) Patent No.: US 11,636,720 B2
(45) Date of Patent: Apr. 25, 2023

(54) AUTHENTICATION SYSTEM

(71) Applicant: KABUSHIKI KAISHA TOKAI RIKA DENKI SEISAKUSHO, Aichi (JP)

(72) Inventors: Yosuke Ohashi, Aichi (JP); Masateru Furuta, Aichi (JP); Yuki Kono, Aichi (JP); Shigenori Nitta, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 70 days.

(21) Appl. No.: 17/173,544

(22) Filed: Feb. 11, 2021

(65) Prior Publication Data
US 2021/0304533 A1 Sep. 30, 2021

(30) Foreign Application Priority Data
Mar. 24, 2020 (JP) .............................. JP2020-052089

(51) Int. Cl.
*G07C 9/00* (2020.01)
*H04W 12/06* (2021.01)
(Continued)

(52) U.S. Cl.
CPC ........ *G07C 9/00309* (2013.01); *H04W 4/023* (2013.01); *H04W 12/06* (2013.01);
(Continued)

(58) Field of Classification Search
CPC ...... G07C 9/00309; G07C 2009/00769; G07C 2209/63; H04W 4/023; H04W 12/06; H04W 12/63; G06F 21/602
See application file for complete search history.

(56) References Cited

U.S. PATENT DOCUMENTS 9,894,492 B1 * 2/2018 Elangovan .............. H04W 4/40
2014/0129051 A1 5/2014 Gautama et al.
(Continued)

FOREIGN PATENT DOCUMENTS

DE 102013221936 5/2014
DE 102017108740 10/2017
(Continued)

*Primary Examiner* — Vernal U Brown
(74) *Attorney, Agent, or Firm* — Greenblum & Bernstein, P.L.C.

(57) ABSTRACT

An authentication system comprising: a plurality of communication devices; and a control device configured to execute a process on a basis of information obtained through wireless communication between the respective communication devices and another communication device that is different from the plurality of communication devices, wherein each of the plurality of communication devices includes a wireless communication section configured to perform wireless communication with the other communication device, and the control device determines that the other communication device is successfully authenticated in a case where any one of a plurality of pieces of information regarding distances between the respective communication devices and the other communication device satisfies a designated condition on a basis of the pieces of information regarding the distances obtained through the wireless communication between the respective communication devices and the other communication device.

18 Claims, 7 Drawing Sheets

(51) Int. Cl.
*H04W 4/02* (2018.01)
*H04W 12/63* (2021.01)

(52) U.S. Cl.
CPC .. *H04W 12/63* (2021.01); *G07C 2009/00333* (2013.01); *G07C 2009/00769* (2013.01)

(56) References Cited

U.S. PATENT DOCUMENTS

| | | |
|---|---|---|
| 2016/0320469 A1 | 11/2016 | Laifenfeld et al. |
| 2017/0309098 A1 | 10/2017 | Watters et al. |
| 2018/0234797 A1* | 8/2018 | Ledvina ................ B60R 25/24 |
| 2020/0031315 A1 | 1/2020 | Breer et al. |

FOREIGN PATENT DOCUMENTS

| | | |
|---|---|---|
| DE | 102016118641 | 4/2018 |
| JP | 2014-051809 | 3/2014 |

* cited by examiner

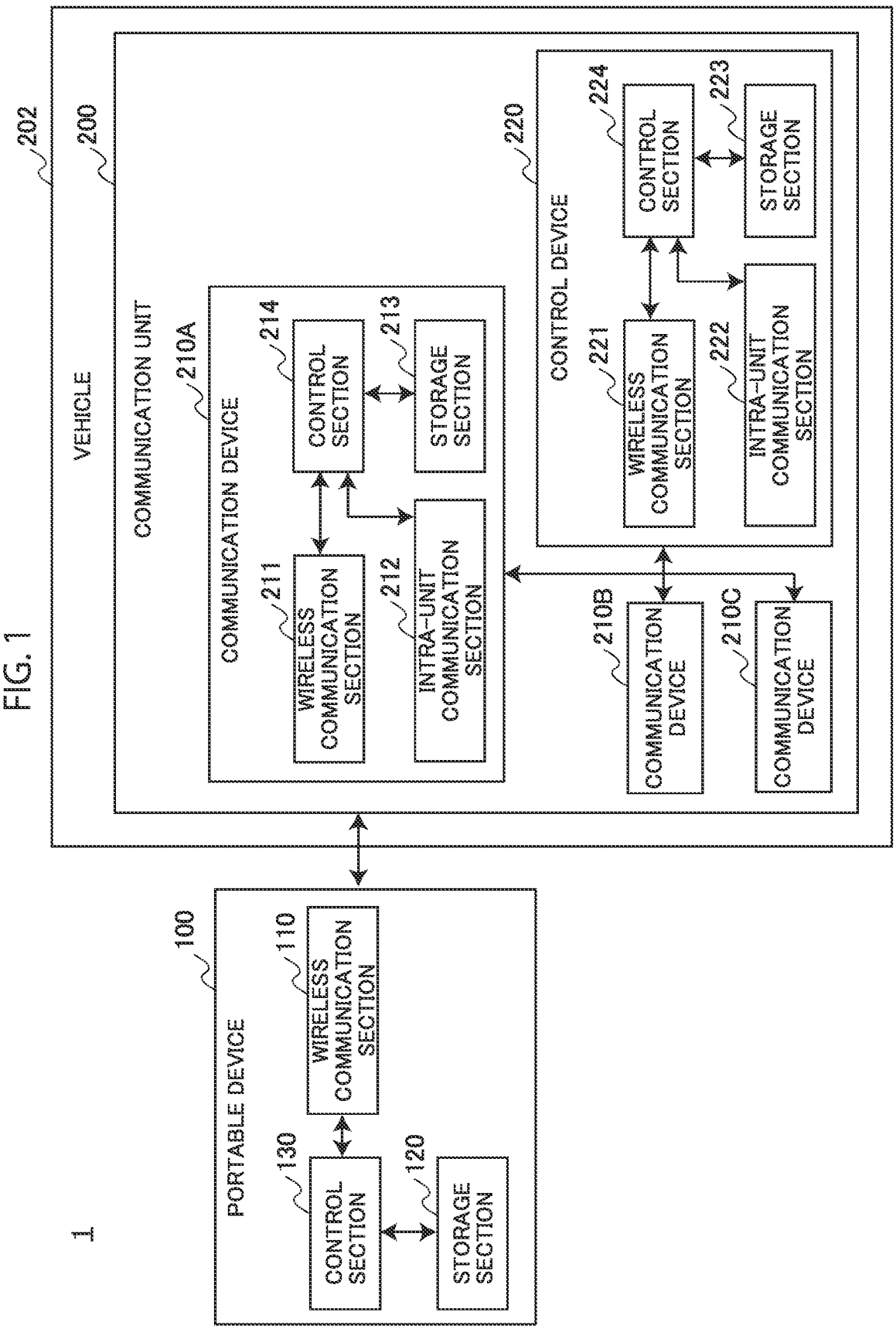

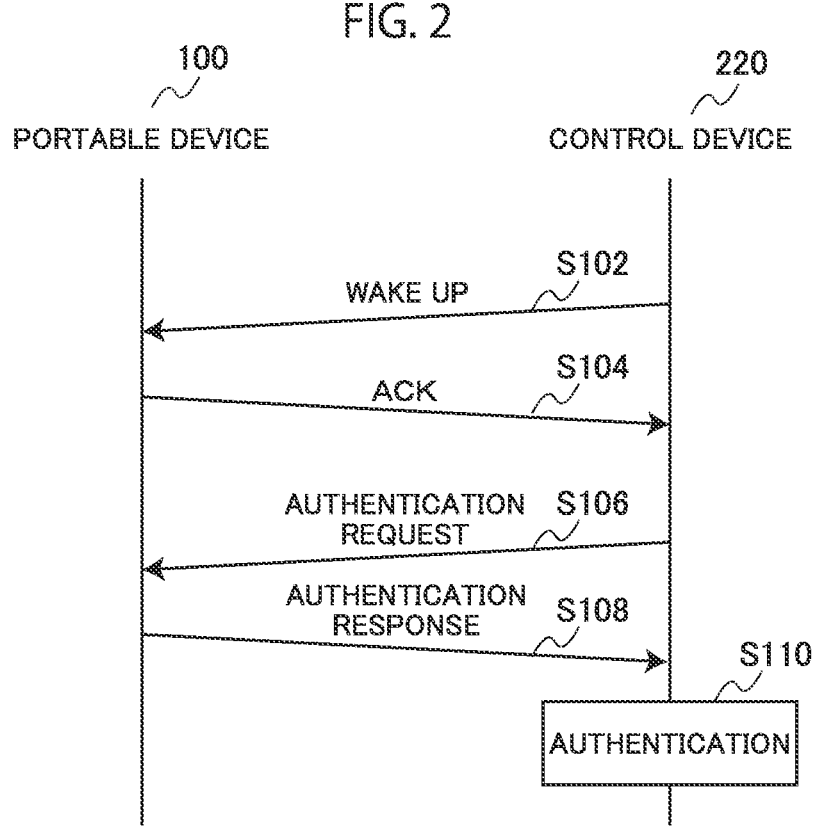
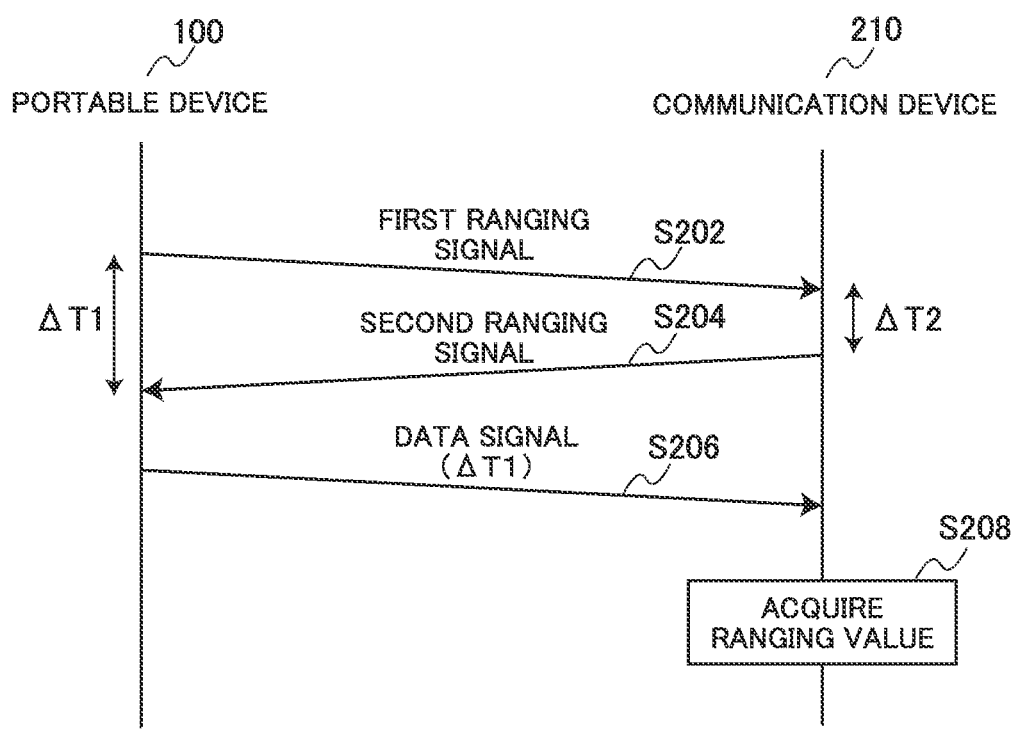

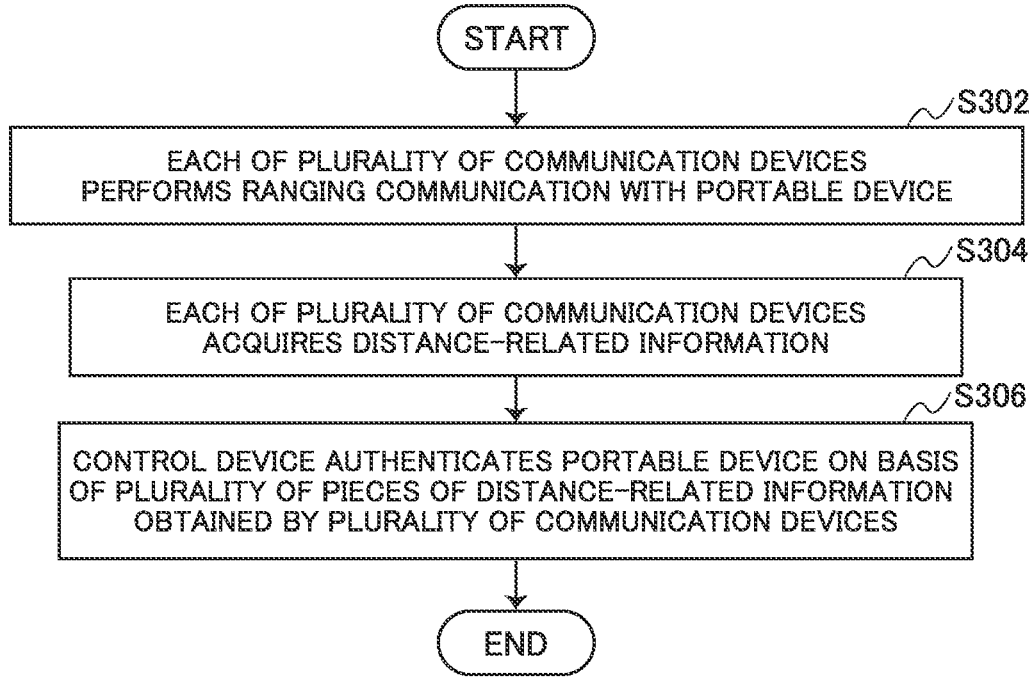
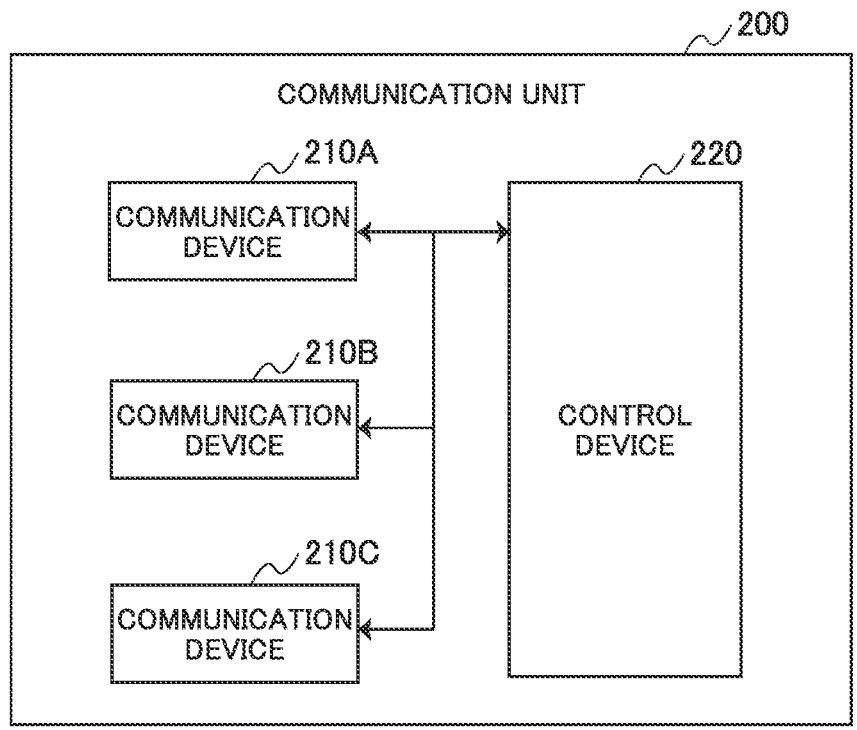

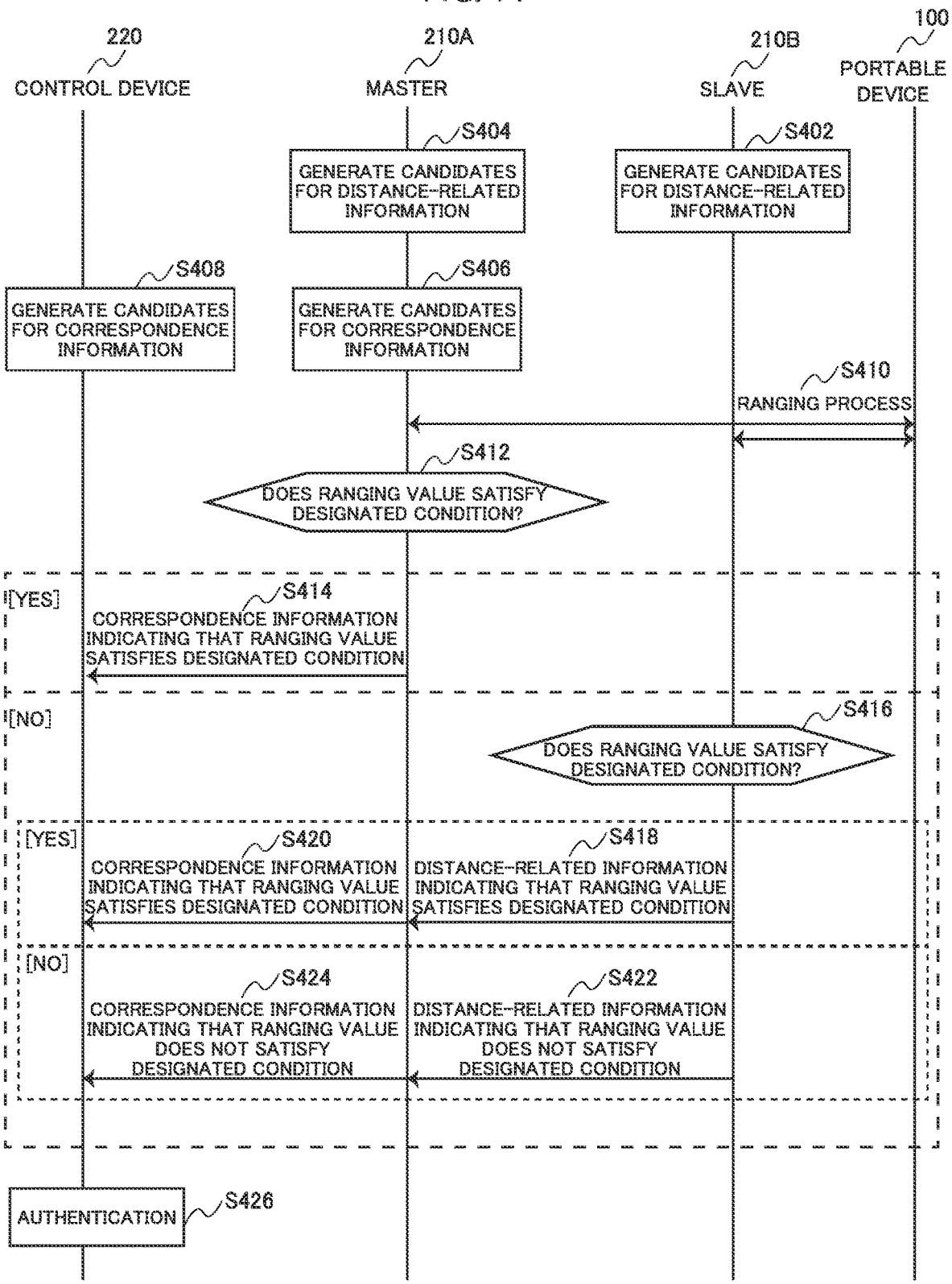

AUTHENTICATION SYSTEM

CROSS REFERENCE TO RELATED APPLICATION(S)

This application is based upon and claims benefit of priority from Japanese Patent Application No. 2020-052089, filed on Mar. 24, 2020, the entire contents of which are incorporated herein by reference.

BACKGROUND

The present invention relates to an authentication system.

In recent years, ranging technologies for measuring a distance between devices have been used for various kinds of services. For example, JP 2014-51809A discloses a technology of measuring a distance between a vehicle, a portable device and determining whether or not to allow a door to be locked or unlocked depending on the measured distance, and warning that the door is open.

According to the technology disclosed in JP 2014-51809A, the single distance between the vehicle and the portable device is measured and is used for a service of locking or unlocking the door and other services. However, JP 2014-51809A has never considered cases where a plurality of distances are measured and are used for the services.

Accordingly, the present invention is made in view of the aforementioned issue, and an object of the present invention is to provide a mechanism that makes it possible to perform authentication on the basis of a plurality of measured distances.

SUMMARY

To solve the above described problem, according to an aspect of the present invention, there is provided an authentication system comprising: a plurality of communication devices; and a control device configured to execute a process on a basis of information obtained through wireless communication between the respective communication devices and another communication device that is different from the plurality of communication devices, wherein each of the plurality of communication devices includes a wireless communication section configured to perform wireless communication with the other communication device, and the control device determines that the other communication device is successfully authenticated in a case where any one of a plurality of pieces of information regarding distances between the respective communication devices and the other communication device satisfies a designated condition on a basis of the pieces of information regarding the distances obtained through the wireless communication between the respective communication devices and the other communication device.

To solve the above described problem, according to another aspect of the present invention, there is provided an authentication system comprising: a plurality of communication devices; and a control device configured to execute a process on a basis of information obtained through wireless communication between the respective communication devices and another communication device that is different from the plurality of communication devices, wherein each of the plurality of communication devices includes a wireless communication section configured to perform wireless communication with the other communication device, and the control device determines that authentication of the other communication device is failed in a case where all pieces of information regarding distances between the respective communication devices and the other communication device do not satisfy a designated condition on a basis of the pieces of information regarding the distances obtained through the wireless communication between the respective communication devices and the other communication device.

As described above, according to the present invention, it is possible to provide the mechanism that makes it possible to perform authentication on the basis of a plurality of measured distances.

BRIEF DESCRIPTION OF THE DRAWINGS

FIG. 1 is a diagram illustrating an example of a configuration of a system according to an embodiment of the present invention.

FIG. 2 is a sequence diagram illustrating an example of a flow of request response authentication performed by the system according to the embodiment.

FIG. 3 is a sequence diagram illustrating an example of a flow of a ranging process performed by the system according to the embodiment.

FIG. 4 is a flowchart illustrating an example of a basic flow of a second authentication process performed by a communication unit according to the embodiment.

FIG. 5 is a block diagram illustrating a first connection configuration regarding connection between a control device and communication devices according to the embodiment.

FIG. 11 is a sequence diagram illustrating a detailed example of a flow of a second authentication process performed by the communication unit according to the embodiment.

DETAILED DESCRIPTION OF THE EMBODIMENT(S)

Figure 6:
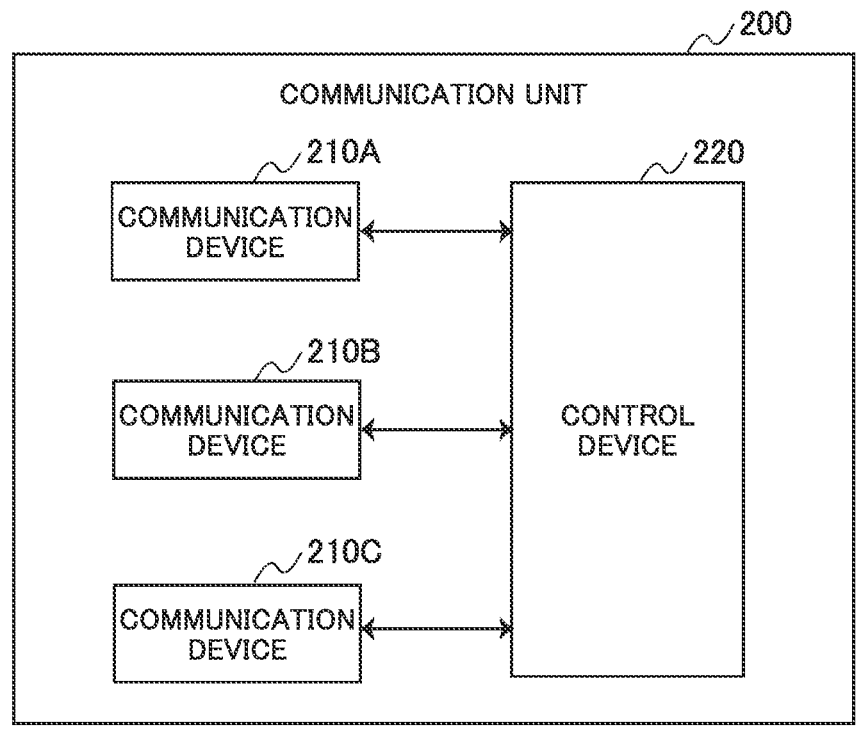
FIG. 6 is a block diagram illustrating a second connection configuration regarding connection between the control device and the communication devices according to the embodiment.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

Further, in the present specification and the drawings, different alphabets are suffixed to a same reference numeral to distinguish elements which have substantially the same functional configuration. For example, a plurality of elements which have substantially the same functional configuration are distinguished such as communication sections 210A, 210B, and 210C, as necessary. However, when there is no need in particular to distinguish structural elements that have substantially the same functional configuration, the same reference numeral alone is attached. For example, in a case in which it is not necessary to particularly distinguish the communication sections 210A, 210B, and 210C, the communication sections 210A, 210B, and 210C are simply referred to as the communication sections 210.

1. Configuration Example

FIG. 1 is a diagram illustrating an example of a configuration of a system 1 according to an embodiment of the present invention. As illustrated in FIG. 1, the system 1 according to the present embodiment includes a portable device 100 and a communication unit 200. The communication unit 200 according to the present embodiment is installed in a vehicle 202. The vehicle 202 is an example of a usage target of the user.

A device of an authenticatee and a device of an authenticator are involved in the present embodiment. The portable device 100 is an example of the device of the authenticatee. The communication unit 200 is an example of the device of the authenticator. The system 1 is also referred to as an authentication system.

When a user (for example, a driver of the vehicle 202) carrying the portable device 100 approaches the vehicle 202, wireless communication for authentication is performed between the portable device 100 and the communication unit 200. Next, when the authentication succeeds, the vehicle 202 becomes available for the user by opening a door lock of the vehicle 202 or starting an engine of the vehicle 202. The system 1 is also referred to as a smart entry system. Next, respective structural elements will be described sequentially.

(1) Portable Device 100

The portable device 100 is an example of a communication device. The portable device 100 is configured as any device to be carried by the user. Examples of the any device include an electronic key, a smartphone, a wearable terminal, and the like.

As illustrated in FIG. 1, the portable device 100 includes a wireless communication section 110, a storage section 120, and a control section 130.

The wireless communication section 110 has a function of performing communication with the communication unit 200 in conformity with a predetermined wireless communication standard. For example, the wireless communication section 110 is configured as a communication interface that makes it possible to perform communication in conformity with a first wireless communication standard and a second wireless communication standard.

The first wireless communication standard may satisfy at least any of a requirement that the first wireless communication standard achieves higher gain than the second wireless communication standard or a requirement that the first wireless communication standard achieves lower electric power consumption on a reception side than the second wireless communication standard.

As a specific example that satisfies such a requirement, the second wireless communication standard may use a carrier wave of higher frequency than frequency of a carrier wave used under the first wireless communication standard. As the frequency of the carrier wave gets higher, attenuation based on distance gets larger and the gain gets reduced. As the frequency of the carrier wave gets lower, attenuation based on distance gets smaller and the gain gets increased. Accordingly, the above-described requirement related to the gain is satisfied.

In addition, when the carrier wave has a high frequency, effects on a human body such as absorption into the human body get larger, and the gain gets reduced.

Note that, considering that sampling frequency is set depending on a maximum value of frequency of the carrier wave, it is sufficient to satisfy at least a requirement that maximum frequency of the carrier wave based on the second wireless communication standard is higher than maximum frequency of the carrier wave based on the first wireless communication standard.

For example, in accordance with the first wireless communication standard, an ultra high frequency (UHF) band signal and a low frequency (LF) band signal may be used. In a typical smart entry system, the UHF band signal is used for transmission from the portable device 100 to the communication unit 200, and the LF band signal is used for transmission from the communication unit 200 to the portable device 100. The wireless communication section 110 may use the UHF band signal for transmission to the communication unit 200. In addition, the wireless communication section 110 may receive the LF band signal from the communication unit 200.

For example, in accordance with the second wireless communication standard, an ultra-wideband (UWB) signal may be used. An impulse UWB signal has a property that makes it possible to perform ranging with high accuracy. In other words, it is possible for the impulse UWB signal to measure air propagation time of a radio wave with high accuracy by using the radio wave of ultra-short pulse width of a nanosecond or less, and it is possible to perform ranging with high accuracy on the basis of the propagation time. Here, the ranging means measurement of a distance between devices that transmit and receive the signal. The distance measured through the ranging is also referred to as a ranging value. In addition, a process of performing the ranging is also referred to as a ranging process.

The storage section 120 has a function of storing various kinds of information for operating the portable device 100. For example, the storage section 120 stores a program for operating the portable device 100, and an identifier (ID), password, and authentication algorithm for authentication, etc. For example, the storage section 120 includes a storage medium such as flash memory and a processing device that performs recording/playback on/of the storage medium.

The control section 130 has a function of controlling overall operation performed by the portable device 100. For example, the control section 130 controls the wireless communication section 110 to perform communication with the communication unit 200. In addition, the control section 130 reads information from the storage section 120 and writes information into the storage section 120. For example, the control section 130 includes a central processing unit (CPU) and an electronic circuit such as a microprocessor.

(2) Communication Unit 200

The communication unit 200 is prepared in association with the vehicle 202. Here, the communication unit 200 is assumed to be installed in the vehicle 202. For examples of the installation position, the communication unit 200 may be installed in a vehicle interior of the vehicle 202, may be built in the vehicle 202 as a communication module, or may be installed in other ways. As illustrated in FIG. 1, the communication unit 200 includes a plurality of communication devices 210 (210A to 210C) and a control device 220.

Communication Devices 210

The communication devices 210 are devices that perform wireless communication with the portable device 100.

As illustrated in FIG. 1, the communication device 210A includes a wireless communication section 211, an intra-unit communication section 212, a storage section 213, and a control section 214. Note that, the communication device 210B and the communication device 210C include structural elements similar to the communication device 210A.

The wireless communication section 211 has a function of performing communication with portable device 100 in conformity with a predetermined wireless communication standard. The wireless communication section 211 is configured as a communication interface that makes it possible to perform communication in conformity with the second wireless communication standard, for example. In other words, the wireless communication section 211 transmits and receives UWB signals.

The intra-unit communication section 212 has a function of performing communication with other devices included in the communication unit 200. For example, the intra-unit communication section 212 performs communication with the control device 220. For another example, the intra-unit communication section 212 performs communication with other communication devices 210. For example, the intra-unit communication section 212 is configured as a communication interface that makes it possible to perform communication in conformity with any in-vehicle network standard such as Local Interconnect Network (LIN) or Controller Area Network (CAN).

The storage section 213 has a function of storing various kinds of information for operating the communication device 210. For example, the storage section 213 stores a program for operating the communication device 210, and an identifier (ID), password, and authentication algorithm for authentication, etc. For example, the storage section 213 includes a storage medium such as flash memory and a processing device that performs recording/playback on/of the storage medium.

The control section 214 has a function of controlling operation performed by the communication device 210. For example, the control section 214 controls the wireless communication section 211 to perform communication with the portable device 100. For another example, the control section 214 controls the intra-unit communication section 212 to perform communication with other devices included in the communication unit 200. For another example, the control section 214 reads information from the storage section 213 and writes information into the storage section 213. For example, the control section 214 may be configured as an electronic control unit (ECU).

Control Device 220

The control device 220 is a device that performs a process on the basis of information obtained through wireless communication between the respective communication devices 210 and the portable device 100, which is another communication device different from the plurality of communication devices 210.

As illustrated in FIG. 1, the control device 220 includes a wireless communication section 221, an intra-unit communication section 222, a storage section 223, and a control section 224.

The wireless communication section 221 has a function of performing wireless communication with the portable device 100. The wireless communication section 221 is configured as a communication interface that makes it possible to perform communication in conformity with the first wireless communication standard, for example. In other words, the wireless communication section 221 transmits the LF band signal. In addition, the wireless communication section 221 receives the UHF band signal.

The intra-unit communication section 222 has a function of performing communication with other devices included in the communication unit 200. For example, the intra-unit communication section 222 performs communication with the communication devices 210. For example, the intra-unit communication section 222 is configured as a communication interface that makes it possible to perform communication in conformity with any in-vehicle network standard such as the Local Interconnect Network (LIN) or the Controller Area Network (CAN).

The storage section 223 has a function of storing various kinds of information for operating the control device 220. For example, the storage section 223 stores a program for operating the control device 220, and an identifier (ID), password, and authentication algorithm for authentication, etc. For example, the storage section 223 includes a storage medium such as flash memory and a processing device that performs recording/playback on/of the storage medium.

The control section 224 has a function of controlling operation performed by the control device 220. For example, the control section 224 controls the wireless communication section 221 to perform communication with the portable device 100. For another example, the control section 224 controls the intra-unit communication section 222 to perform communication with other devices included in the communication unit 200. For another example, the control section 224 reads information from the storage section 223 and writes information into the storage section 223. For example, the control section 224 may be configured as an electronic control unit (ECU).

In particular, the control section 224 performs a process based on information obtained through wireless communication between the respective communication devices 210 and the portable device 100. The process may be performed further on the basis of information obtained through wireless communication between the control device 220 and the portable device 100.

An example of the process is an authentication process of authenticating the portable device 100. Another example of the process is a process of controlling a door lock of the vehicle 202 such as closing and opening the door lock. Another example of the process is a process of controlling a power source such as starting and stopping the engine of the vehicle 202. Note that, a motor or the like may be installed as the power source in the vehicle 202 in addition to or instead of the engine.

2. Technical Features

<2.1. Basic Features>

(1) Two-Step Authentication

The portable device 100 and the communication unit 200 of the vehicle 202 according to the present embodiment performs a plurality of authentication processes step by step. As an example, it is assumed that two-step authentication will be performed.

An authentication process in a first step (hereinafter, also referred to as a first authentication process) includes the request response authentication, for example. The request response authentication is an authentication method in which an authenticator generates an authentication request and transmits the generated authentication request to an authenticatee, the authenticatee generates an authentication response on the basis of the authentication request and transmits the generated authentication response to the authenticator, and the authenticator authenticates the authenticatee on the basis of the authentication response. The authentication request is a signal of requesting a response of information necessary for the authentication. The authentication response is data generated on the basis of the authentication request and information regarding the authenticatee (such as an ID and a password, for example). Typically, the authentication request is random numbers, and is changed with each authentication. Accordingly, the request response authentication is resistant to a replay attack. In addition, the authentication response is generated on the basis of the information regarding the authenticatee (such as the ID and the password, for example). In other words, the ID and the password themselves are not transmitted/received. This makes it possible to prevent eavesdropping.

An authentication process in a second step (hereinafter, also referred to as a second authentication process) that is performed subsequent to the first authentication process is authentication based on a distance, for example. The authentication based on the distance includes the ranging process, which is a process of measuring a distance between the portable device 100 and the communication unit 200, and a process of performing authentication on the basis of the ranging value, which is a result of measuring the distance. In the second authentication process, the authentication is performed on the basis of whether or not the ranging value satisfies a predetermined condition. For example, the authentication succeeds if the ranging value is less than or equal to a predetermined value. If not, the authentication ends in failure.

As described above, it is possible to enhance security when the plurality of authentication processes is performed step by step.

Before the first authentication process, it is also possible to transmit/receive a wake-up signal for instructing to activate the device, and a response to the wake-up signal. The wake-up signal causes a receiver to wake up from a sleep mode. Examples of the response to the wake-up signal include an acknowledgment (ACK) signal that indicates activation, and a negative acknowledgement (NACK) signal that indicates non-activation.

(2) Request Response Authentication

As an example, in the request response authentication, communication is performed in conformity with the first wireless communication standard. This is because, in the request response authentication, data is transmitted and received, and therefore it is desirable to use a wireless communication standard that provides higher gain.

Next, with reference to FIG. 2, an example of a flow of the request response authentication will be described.

FIG. 2 is a sequence diagram illustrating the example of the flow of the request response authentication performed by the system 1 according to the present embodiment. As illustrated in FIG. 2, the portable device 100 and the control device 220 are involved in this sequence.

As illustrated in FIG. 2, the wireless communication section 221 of the control device 220 first transmits a wake-up signal for instructing to activate the portable device 100 (Step S102). The wake-up signal may be transmitted as the UHF/LF band signal.

When the wake-up signal is received, the wireless communication section 110 of the portable device 100 transmits an ACK signal as a response to the wake-up signal (Step S104). The ACK signal may be transmitted as the UHF/LF band signal.

Next, the control section 224 of the control device 220 generates an authentication request. Next, the wireless communication section 221 of the control device 220 transmits a signal including the generated authentication request (Step S106). The signal including the authentication request may be transmitted as the UHF/LF band signal.

When the wireless communication section 110 receives the signal including the authentication request, the control section 130 of the portable device 100 generates an authentication response on the basis of the received authentication request. Next, the wireless communication section 110 of the portable device 100 transmits a signal including the generated authentication response (Step S108). The signal including the authentication response may be transmitted as the UHF/LF band signal.

When the wireless communication section 221 receives the signal including the authentication response, the control section 224 of the control device 220 authenticates the portable device 110 on the basis of the received authentication response (Step S110).

(3) Ranging Process

As an example, in the ranging process, communication is performed in conformity with the second wireless communication standard. This is because perform ranging with high accuracy on the basis of propagation time by using the UWB impulse signal. The ranging process includes transmission/reception of signals for the ranging process, and calculation of the ranging value on the basis of information obtained by transmitting and receiving the signals for the ranging process.

An example of the signals transmitted and received for the ranging process is a ranging signal. The ranging signal is a signal transmitted and received for measuring a distance between devices. The ranging signal is also a measurement target signal. For example, time taken to transmit or receive the ranging signal is measured. The ranging signal is typically configured in a frame format that does not include a payload part for storing data. Alternatively, the ranging signal may be a signal configured in a frame format that includes the payload part.

In the ranging process, a plurality of the ranging signals may be transmitted and received between devices. Among the plurality of ranging signals, a ranging signal transmitted from one device to another device is also referred to as a first ranging signal. Alternatively, a ranging signal transmitted from the device that has received the first ranging signal to the device that has transmitted the first ranging signal is also referred to as a second ranging signal.

Another example of the signals transmitted and received for the ranging process is a data signal. The data signal is a signal that stores and carries data. The data signal is configured in the frame format that includes the payload part for storing the data.

Hereinafter, transmission/reception of the ranging signal or the data signal in the ranging process is also referred to as ranging communication.

Next, with reference to FIG. 3, an example of a flow of the ranging process will be described.

FIG. 3 is a sequence diagram illustrating the example of the flow of the ranging process performed by the system 1 according to the present embodiment. As illustrated in FIG. 3, the portable device 100 and the communication device 210 are involved in this sequence.

As illustrated in FIG. 3, the wireless communication section 110 of the portable device 100 first transmits the first ranging signal (Step S202). The first ranging signal is transmitted as the UWB signal.

When the first ranging signal is received from the portable device 100, the wireless communication section 211 of the communication device 210 transmits the second ranging signal in response to the first ranging signal (Step S204). The second ranging signal is transmitted as the UWB signal.

When the wireless communication section 110 receives the second ranging signal, the control section 130 of the portable device 100 measures a time period ΔT1 that is a time period from time of transmission of the first ranging signal to time of reception of the second ranging signal. Next, the wireless communication section 110 of the portable device 100 transmits a data signal including information obtained by encrypting information indicating the measured time period ΔT1 (Step S206). The data signal is transmitted as the UWB signal.

On the other hand, the control section 214 of the communication device 210 measures a time period ΔT2 from time of reception of the first ranging signal to time of transmission of the second ranging signal. Next, when the wireless communication section 211 receives the data signal from the portable device 100, the control section 214 of the communication device 210 acquires a ranging value indicating a distance between the portable device 100 and the communication device 210 on the basis of the measured time period ΔT2 and the time period ΔT1 indicated by the received data signal (Step S208). For example, first, propagation time is calculated by subtracting ΔT2 from ΔT1 and dividing the subtracted value by 2. The propagation time described herein is time taken to transmit or receive a one-way signal between the portable device 100 and the communication device 210. In addition, it is possible to calculate the ranging value indicating the distance between the portable device 100 and the communication device 210 by multiplying the propagation time by speed of the signal.

(4) Authentication Based on Ranging Value

The control device 220 authenticates the portable device 100 on the basis of pieces of information regarding respective distances between the plurality of control devices 210 and the portable device 100. The pieces of information are obtained through the wireless communication between the respective communication devices 210 and the portable device 100.

Hereinafter, the information regarding the distance is also referred to as distance-related information. The plurality of communication devices 210 acquires respective pieces of the distance-related information on the basis of wireless communication with the portable device 100.

The control device 220 acquires the plurality of pieces of distance-related information from the plurality of communication devices 210. Next, the control device 220 authenticates the portable device 100 on the basis of the plurality of pieces of distance-related information that have been acquired. Specifically, the control device 220 determines that the portable device 100 is successfully authenticated in the case where any one of the plurality of pieces of distance-related information satisfies a designated condition. On the other hand, the control device 220 determines that authentication of the portable device 100 is failed in the case where all the pieces of distance-related information do not satisfy the designated condition.

Hereinafter, first distance-related information to fourth distance-related information will be described as examples of the distance-related information. The distance-related information includes at least any of the first distance-related information to the fourth distance-related information.

First Distance-Related Information

The distance-related information may be a distance between the communication device 210 and the portable device 100. For example, the distance is the ranging value obtained through the above-described ranging process.

Each of the plurality of communication devices 210 calculates a distance to the portable device 100. For example, the plurality of communication devices 210 calculate the respective distances to the portable device 100 by performing the above-described ranging process.

The control device 220 determines whether or not the distance included in the distance-related information satisfies the designated condition, and determines whether or not the portable device 100 is successfully authenticated. For example, the designated condition is a condition that the distance included in the distance-related information is less than or equal to a predetermined threshold. In this case, the control device 220 determines that the distance-related information satisfies the designated condition when the distance included in the distance-related information is less than or equal to the predetermined threshold. On the other hand, the control device 220 determines that the distance-related information does not satisfy the designated condition when the distance included in the distance-related information exceeds the predetermined threshold. Next, the control device 220 determines that the portable device 100 is successfully authenticated in the case where any one of the plurality of pieces of distance-related information obtained by the plurality of communication devices 210 satisfies the designated condition. On the other hand, the control device 220 determines that authentication of the portable device 100 is failed in the case where all the pieces of distance-related information obtained by the plurality of control devices 210 do not satisfy the designated condition.

Second Distance-Related Information

The distance-related information may be a time length to be used for calculating the distance between the communication device 210 and the portable device 100. For example, the time length is the propagation time, which is time taken to transmit or receive a one-way ranging signal between the portable device 100 and the communication device 210. For another example, the time length is the time period ΔT1 and the time period ΔT2 to be used for calculating the propagation time.

The plurality of communication devices acquires the respective time lengths. For example, the plurality of communication devices 210 acquires the respective time lengths by performing at least the ranging communication with regard to the ranging process described above.

The control device 220 calculates the respective distances between the plurality of communication devices 210 and the portable device 100 on the basis of the time lengths included in the distance-related information. For example, in the case where the time length included in the distance-related information is the propagation time, the control device 220 calculates the distance by multiplying the propagation time by speed of the signal. For another example, in the case where the time length included in the distance-related information is the time periods ΔT1 and ΔT2, the control device 220 first calculates the propagation time on the basis of ΔT1 and ΔT2, and then calculates the distance on the basis of the calculated propagation time.

Next, the control device 220 determines whether or not the calculated distances satisfy the designated condition, and determines whether or not the portable device 100 is successfully authenticated. For example, the designated condition is a condition that a calculated distance is less than or equal to the predetermined threshold. In this case, the control device 220 determines that the distance-related information satisfies the designated condition when the calculated distance is less than or equal to the predetermined threshold. On the other hand, the control device 220 determines that the distance-related information does not satisfy the designated condition when the calculated distance exceeds the predetermined threshold. Next, the control device 220 determines that the portable device 100 is successfully authenticated in the case where any one of the plurality of pieces of distance-related information obtained by the plurality of communication devices 210 satisfies the designated condition. On the other hand, the control device 220 determines that authentication of the portable device 100 is failed in the case where all the pieces of distance-related information obtained by the plurality of control devices 210 do not satisfy the designated condition.

Third Distance-Related Information

The distance-related information may be a time to be used for calculating the distance between the communication device 210 and the portable device 100. For example, the time is transmission time of the first ranging signal, which is a start of the time period ΔT1. For another example, the time is reception time of the second ranging signal, which is an end of the time period ΔT1. For another example, the time is reception time of the first ranging signal, which is a start of the time period ΔT2. For another example, the time is transmission time of the second ranging signal, which is an end of the time period ΔT2.

Each of the plurality of communication devices acquires the above-described times. For example, each of the plurality of communication devices 210 acquires the times by performing at least the ranging communication with regard to the ranging process described above.

The control device 220 acquires the time lengths to be used for calculating the respective distances between the plurality of communication devices 210 and the portable device 100 on the basis of the times included in the distance-related information. For example, the time lengths are the propagation times. For another example, the time lengths are the time period ΔT1 and the time period ΔT2.

Next, the control device 220 calculates the respective distances between the plurality of communication devices 210 and the portable device 100 on the basis of the acquired time lengths. For example, in the case where the acquired time length is the propagation time, the control device 220 calculates the distance by multiplying the propagation time by speed of the signal. For another example, in the case where the acquired time length is the time periods ΔT1 and ΔT2, the control device 220 first calculates the propagation time on the basis of ΔT1 and ΔT2, and then calculates the distance on the basis of the calculated propagation time.

Next, the control device 220 determines whether or not the calculated distances satisfy the designated condition, and determines whether or not the portable device 100 is successfully authenticated. For example, the designated condition is a condition that the calculated distance is less than or equal to the predetermined threshold. In this case, the control device 220 determines that the distance-related information satisfies the designated condition when the calculated distance is less than or equal to the predetermined threshold. On the other hand, the control device 220 determines that the distance-related information does not satisfy the designated condition when the calculated distance exceeds the predetermined threshold. Next, the control device 220 determines that the portable device 100 is successfully authenticated in the case where any one of the plurality of pieces of distance-related information obtained by the plurality of communication devices 210 satisfies the designated condition. On the other hand, the control device 220 determines that authentication of the portable device 100 is failed in the case where all the pieces of distance-related information obtained by the plurality of control devices 210 do not satisfy the designated condition.

Fourth Distance-Related Information

The distance-related information may be information indicating whether or not a distance between the communication device 210 and the portable device 100 satisfies the designated condition.

Each of the plurality of communication devices 210 calculates a distance between the communication device 210 and the portable device 100. For example, the plurality of communication devices 210 calculate the respective distances to the portable device 100 by performing the above-described ranging process.

Next, each of the plurality of communication devices 210 determines whether or not the distance between the communication device 210 and the portable device 100 satisfies the designated condition. For example, the designated condition is a condition that the calculated distance is less than or equal to the predetermined threshold. In this case, each of the plurality of communication devices determines whether or not the calculated distance satisfies the designated condition. Next, in the case where the calculated distance is less than or equal to the predetermined threshold, each of the plurality of communication devices 210 determines that the distance between the communication device 210 and the portable device 100 satisfies the designated condition. On the other hand, in the case where the calculated distance exceeds the predetermined threshold, each of the plurality of communication devices 210 determines that the distance between the communication device 210 and the portable device 100 does not satisfy the designated condition.

Next, the control device 220 determines whether or not the portable device 100 is successfully authenticated on the basis of information indicating whether or not the distance between the communication device 210 and the portable device 100, which is included in the distance-related information, satisfies the designated condition. Specifically, the control device 220 determines that the portable device 100 is successfully authenticated in the case where any one of the plurality of pieces of distance-related information obtained by the plurality of communication devices 210 indicates that the designated condition is satisfied. On the other hand, the control device 220 determines that authentication of the portable device 100 is failed in the case where all the pieces of distance-related information obtained by the plurality of control devices 210 indicate that the designated condition is not satisfied.

(5) Use of Authentication Result

The control device 220 performs the second authentication process in the case where the authentication succeeds in the first authentication process. On the other hand, the control device 220 determines that the authentication of the portable device 100 is failed in the case where the authentication ends in failure in the first authentication process.

The control device 220 determines that the portable device 100 is successfully authenticated in the case where the authentication succeeds in the second authentication process. On the other hand, the control device 220 determines that the authentication of the portable device 100 is failed in the case where the authentication ends in failure in the second authentication process.

For example, the control device 200 allows or performs operation of opening or closing the door lock of the vehicle

202 in the case where it is determined that the portable device 100 is successfully authenticated. Therefore, for example, a vehicle door is unlocked when the door handle is touched in a state where the door is locked. In addition, the vehicle door is locked when a lock button of the door handle is pushed in a state where the door is unlocked.

For another example, the control device 200 allows or performs operation of starting the engine through an ignition switch installed in the vehicle 202 in the case where it is determined that the portable device 100 is successfully authenticated. Therefore, for example, the engine of the vehicle 202 starts when the ignition switch is operated while a brake pedal is depressed.

Note that, the control device 220 may include an antenna for wireless communication with an outside of the vehicle interior, and an antenna for wireless communication with an inside of the vehicle interior. In addition, the control device 220 may allow or perform the operation of opening or closing the door lock of the vehicle 202 in the case where the authentication succeeds in the first authentication process and the second authentication process also succeeds through the wireless communication with the outside of the vehicle interior. On the other hand, the control device 220 may allow or perform the operation of starting the engine through the ignition switch installed in the vehicle 202 in the case where the authentication succeeds in the first authentication process and the second authentication process also succeeds through the wireless communication with the inside of the vehicle interior.

(6) Flow of Process

FIG. 4 is a flowchart illustrating an example of a basic flow of the second authentication process performed by the communication unit 200 according to the present embodiment.

As illustrated in FIG. 4, each of the plurality of communication devices 210 first performs the ranging communication with the portable device 100 (Step S302). The ranging communication has been described with reference to Step S202 to Step S206 in FIG. 3.

Next, each of the plurality of communication devices 210 acquires the distance-related information (Step S304). Specifically, each of the plurality of communication devices 210 acquires the distance-related information through the ranging communication in Step S302.

Next, the control device 220 authenticates the portable device 100 on the basis of the plurality of pieces of distance-related information obtained by the plurality of communication devices 210 (Step S306). Specifically, the control device 220 determines that the portable device 100 is successfully authenticated in the case where any one of the plurality of pieces of distance-related information obtained by the plurality of communication devices 210 satisfies the designated condition. On the other hand, the control device 220 determines that authentication of the portable device 100 is failed in the case where all the pieces of distance-related information obtained by the plurality of control devices 210 do not satisfy the designated condition.

<2.2 Connection Configuration Regarding Connection Between Communication Devices and Control Device>

Various kinds of connection configurations can be considered with regard to connection between the communication devices 210 and the control device 220. Next, with reference to FIG. 5 to FIG. 7, examples the connection configuration regarding the connection between the communication devices 210 and the control device 220 will be described.

(1) First Connection Configuration

FIG. 5 is a block diagram illustrating a first connection configuration regarding connection between the control device 220 and the communication devices 210 according to the present embodiment. As illustrated in FIG. 5, each of the communication devices 210A to 210C is connected to the control device 220.

Each of the plurality of communication devices 210 transmits the distance-related information. The control device 220 receives the respective pieces of distance-related information transmitted from the plurality of communication devices 210. Next, the control device 220 authenticates the portable device 100 on the basis of the received distance-related information.

Here, as illustrated in FIG. 5, communication paths between the control device 220 and the respective communication devices 210A to 210 C are unified. In other words, the communication devices 210A to 210C share the communication paths to the control device 220.

Therefore, each of the plurality of communication devices 210 transmits the distance-related information after the carrier sensing is carried out to check an available communication path to the control device 220. Specifically, each of the plurality of communication devices 210 transmits the distance-related information in the case where it is confirmed that there is an available communication path through the carrier sensing. On the other hand, each of the plurality of communication devices 210 temporarily waits in the case where it is confirmed that there is no available communication path through the carrier sensing. Such a configuration makes it possible to prevent collision in the communication paths.

Note that, the Controller Area Network (CAN) serves as an example of an in-vehicle network that transmits information after the carrier sensing is carried out.

(2) Second Connection Configuration

FIG. 6 is a block diagram illustrating a second connection configuration regarding connection between the control device 220 and the communication devices 210 according to the present embodiment. As illustrated in FIG. 6, each of the communication devices 210A to 210C is connected to the control device 220.

Each of the plurality of communication devices 210 transmits the distance-related information. The control device 220 receives the respective pieces of distance-related information transmitted from the plurality of communication devices 210. Next, the control device 220 authenticates the portable device 100 on the basis of the received distance-related information.

Here, as illustrated in FIG. 6, communication paths between the control device 220 and the respective communication devices 210A to 210 C are independent from each other. In other words, the communication devices 210A to 210C have different communication paths to the control device 220.

The plurality of communication devices 210 transmits the distance-related information at respective timings that are previously allocated to the plurality of communication devices 210. For example, the control device 220 may allocate respective timings of transmitting the distance-related information to the plurality of communication devices 210. For another example, any of the plurality of communication devices 210 may allocates the timings of transmitting the distance-related information.

Note that, the Local Interconnect Network (LIN) serves as an example of an in-vehicle network that transmits information at the allocated timings.

(3) Third Connection Configuration

Figure 7:
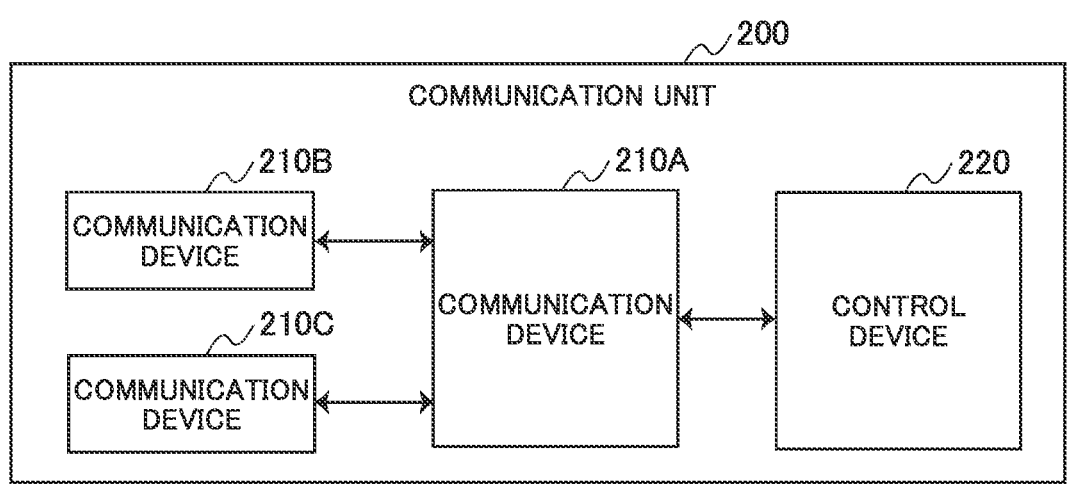
FIG. 7 is a block diagram illustrating a third connection configuration regarding connection between the control device and the communication devices according to the embodiment.

FIG. 7 is a block diagram illustrating a third connection configuration regarding connection between the control device 220 and the communication devices 210 according to the present embodiment. As illustrated in FIG. 7, the communication device 210A is connected to the communication device 210B and the communication device 210C. In addition, the communication device 201A is connected to the control device 220.

According to the third connection configuration, a plurality of communication devices 210 includes a first communication device 210 and second communication devices 210. Hereinafter, the first communication device 210 is also referred to as a master 210. In addition, the second communication devices 210 are also referred to as slaves. In the example illustrated in FIG. 7, the communication device 210A is an example of the master 210. The communication device 210B and the communication device 210C are examples of the slaves 210.

The one or more slaves 210 are connected to the master 210. In addition, the one or more slaves 210 transmits respective pieces of distance-related information. Note that, according to the connection configuration regarding the connection between the master 210 and the slaves 210, information may be transmitted after the carrier sensing is carried out in a way similar to the above-described first connection configuration. Alternatively, according to the connection configuration regarding the connection between the master 210 and the slaves 210, information may be transmitted at allocated timings in a way similar to the above-described second connection configuration.

The master 210 is connected to the one or more slaves 210 and the control device 220. The master 210 receives respective pieces of distance-related information transmitted from the one or more slaves 210. Next, the master 210 transmits the correspondence information that is information corresponding to at least any of a piece of distance-related information obtained by the master 210 and respective pieces of distance-related information received from the one or more slaves 210.

The control device 220 receives the correspondence information transmitted from the master 210. Next, the control device 220 authenticates the portable device 100 on the basis of the received correspondence information.

According to this connection configuration, the control device 220 is capable of treating not all of the piece of distance-related information obtained by the master 210 and the respective pieces of distance-related information obtained by the one or more slaves 210, but the correspondence information as a processing target.

Accordingly, the process performed by the control device 220 is expected to be simplified.

<2.3. Communication within Communication Unit>

Next, technical features of communication within the communication unit 200 will be described on an assumption of the third connection configuration.

Here, the distance-related information is assumed to be the fourth distance-related information. In other words, the distance-related information is information indicating whether or not a distance between the communication device 210 and the portable device 100 satisfies the designated condition. In addition, as the correspondence information, the master transmits information indicating whether or not a distance between the portable device 100 and any of the plurality of communication devices 210 (master 210 and slaves 210) satisfies the designated condition. Specifically, in the case where any of ranging values of the master 210 and the slaves 210 satisfies the designated condition, the master 210 transmits information indicating that the designated condition is satisfied, as the correspondence information. On the other hand, in the case where none of the ranging values of the master 210 and the slaves 210 satisfies the designated condition, the master 210 transmits information indicating that the designated condition is not satisfied, as the correspondence information.

When the correspondence information is received from the master 210, the control device 220 authenticates the portable device 100 on the basis of the received correspondence information. For example, the control device 220 determines that the portable device 100 is successfully authenticated in the case where the correspondence information includes information indicating that the designated condition is satisfied. On the other hand, the control device 220 determines that authentication of the portable device 100 is failed in the case where the correspondence information includes information indicating that the designated condition is not satisfied.

Note that, the master 210 may encrypt and transmit the correspondence information. For example, the master 210 may encrypt the correspondence information by using a common key crypto system. The common key cryptosystem is an encryption method using a same key for encryption and decryption. In other words, the master 210 and the control device 220 use the same key. Such configurations makes it possible to prevent a malicious third person from impersonating a legitimate user, and it is possible to improve security.

In a similar way, the slaves 210 may encrypt and transmit the distance-related information. For example, the slaves 210 may encrypt the distance-related information by using the common key cryptosystem. The common key cryptosystem is the encryption method using a same key for encryption and decryption. In other words, the master 210 and the slaves 210 use the same key. Such configurations makes it possible to improve security.

Note that, the key to be used in the common key cryptosystem may be random numbers. In the case where the key is the random numbers, the random numbers are generated on the basis of a same seed for an encryptor and a decryptor. The seed is random numbers which have different values for each generation, for example. This allows the encryptor and the decryptor to use the same random numbers as the key. The key may be updated as needed. For example, the key may be updated each time the ranging process is performed.

The master 210 may calculate the distance between the master 210 and the portable device 100 before the distance-related information is received from the slaves 210. In this case, the master 210 transmits information indicating whether or not the distance to the portable device 100 satisfies the designated condition, as the correspondence information when the calculated distance satisfies the designated condition. On the other hand, when the calculated distance does not satisfy the designated condition, the master 210 transmits the correspondence information after the distance-related information is received from the slaves 210. In other words, when the ranging value of the master 210 satisfies the designated condition, the master 210 transmits the correspondence information without waiting for reception of the distance-related information from the slaves 210. This makes it possible to improve responsiveness of the second authentication process.

(1) Features of Communication Between Slave and Master

The slave 210 may previously generate candidates for the distance-related information, and may transmit a candidate corresponding to the distance calculated in the ranging process (that is, a ranging value), as the distance-related information. Here, the distance-related information is information indicating whether or not a distance between the slave 210 and the portable device 100 satisfies the designated condition. Also, the candidate for the distance-related information is information indicating whether or not the distance between the slave 210 and the portable device 100 satisfies the designated condition. However, the candidate for the distance-related information is generated before the ranging value is obtained. This is because the word "candidate" is attached. The previously generated candidates for the distance-related information include a first candidate and a second candidate, which will be described below.

Specifically, the slave 210 generates the first candidate for the distance-related information by encrypting information indicating that the distance between the slave 210 and the portable device 100 satisfies the designated condition. In other words, the first candidate for the distance-related information is information obtained by encrypting the information indicating that the distance between the slave 210 and the portable device 100 satisfies the designated condition. Next, the slave 210 performs the ranging process. In the case where a ranging value satisfies the designated condition, the slave 210 transmits the first candidate for distance-related information as the distance-related information. On the other hand, the slave 210 generates the second candidate for the distance-related information by encrypting information indicating that the distance between the slave 210 and the portable device 100 does not satisfy the designated condition. In other words, the second candidate for the distance-related information is information obtained by encrypting the information indicating that the distance between the slave 210 and the portable device 100 does not satisfy the designated condition. Next, the slave 210 performs the ranging process. In the case where a ranging value does not satisfy the designated condition, the slave 210 transmits the second candidate for distance-related information as the distance-related information.

Such a configuration makes it possible to shorten time from the ranging process to transmission of the distance-related information, because the candidates for distance-related information have already been generated before the ranging process. This makes it possible to improve responsiveness of the second authentication process.

On the other hand, the master 210 may previously generate candidates for distance-related information to be received from the slaves 210. Next, the master 210 may transmit the correspondence information in accordance with a result of comparing the generated candidates for distance-related information with pieces of distance-related information received from the slaves 210. For example, the master 210 previously generates the first candidate and the second candidate for distance-related information to be received from the slaves 210. Next, the master 210 determines whether distances between the slaves 210 and the portable device 100 satisfy the designated condition on the basis of whether pieces of actual distance-related information received from the slaves 210 match the first candidate or the second candidate, which have been generated in advance. Such a configuration allows the master 210 to determine whether or not the ranging values of the slaves 210 satisfy the designated condition without decrypting the encrypted distance-related information. This makes it possible to shorten time from when the master 210 receives the distance-related information to when the master transmits the correspondence information. This makes it possible to improve responsiveness of the second authentication process.

Figure 8:
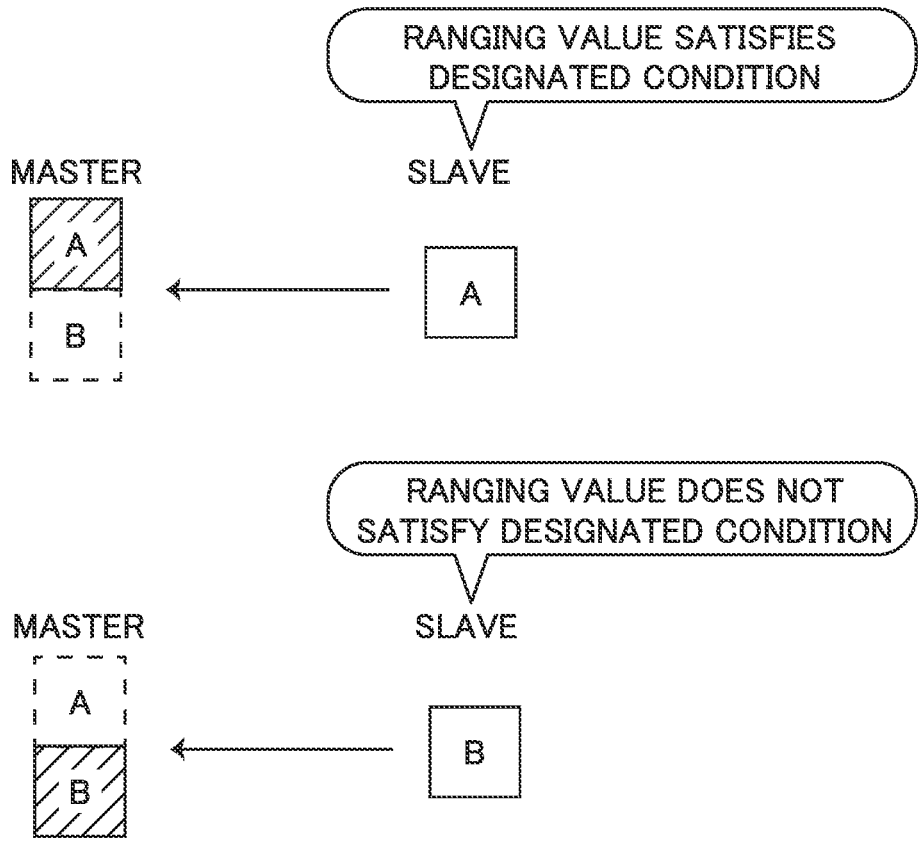
FIG. 8 is a diagram illustrating an example of a flow of information between a master and a slave according to the embodiment.

Details thereof will be described with reference to FIG. 8. FIG. 8 is a diagram illustrating an example of a flow of information between the master 210 and the slave 210 according to the present embodiment. The slave 210 previously generates distance-related information "A" and distance-related information "B" as candidates for distance-related information. The distance-related information "A" is information obtained by encrypting information indicating that a ranging value satisfies the designated condition. In other words, the distance-related information "A" is the first candidate for distance-related information. On the other hand, the distance-related information "B" is information obtained by encrypting information indicating that a ranging value does not satisfy the designated condition. In other words, the distance-related information "B" is the second candidate for distance-related information. In a similar way, the master 210 previously generates distance-related information "A" and distance-related information "B" as candidates for distance-related information.

The slave 210 transmits a candidate for distance-related information in accordance with a ranging value after performing the ranging process. Specifically, as illustrated in the top of FIG. 8, the slave 210 transmits the distance-related information "A" in the case where the ranging value satisfies the designated condition. On the other hand, as illustrated in the bottom of FIG. 8, the slave 210 transmits the distance-related information "B" in the case where the ranging value does not satisfy the designated condition.

The master 210 compares the previously generated distance-related information "A" and distance-related information "B" with the distance-related information received from the slave 210. Next, as illustrated in the top of FIG. 8, the master 210 determines that the ranging value of the slave 210 satisfies the designated condition in the case where the previously generated distance-related information "A" matches the distance-related information received from the slave 210. On the other hand, as illustrated in the bottom of FIG. 8, the master 210 determines that the ranging value of the slave 210 does not satisfy the designated condition in the case where the previously generated distance-related information "B" matches the distance-related information received from the slave 210.

(2) Features of Communication Between Master and Control Device

The master 210 may previously generates candidates for the correspondence information, and may transmit a candidate corresponding to the distance-related information received from the slave and a calculated distance as the correspondence information. Here, the correspondence information is information indicating whether or not a distance between the portable device 100 and any of the plurality of communication devices 210 (master 210 and slave 210) satisfies the designated condition. Also, the candidate for correspondence information is the information indicating whether or not a distance between the portable device 100 and any of the plurality of communication devices 210 (master 210 and slaves 210) satisfies the designated condition. However, the candidate for correspondence information is generated before the master 210 obtains the ranging value or before the master 210 receives the distance-related information from the slave 210. This is because the word "candidate" is attached. The previously generated candidates for correspondence information include a first candidate and a second candidate, which will be described below.

Specifically, the master 210 generates the first candidate for correspondence information by encrypting information indicating that any of the ranging value of the master 210 and the ranging value of the slave 210 satisfies the designated condition. Next, the master 210 performs the ranging process, and receives the distance-related information from the slave 210. Subsequently, the master 210 transmits the first candidate for correspondence information as the correspondence information in the case where any of the ranging value of the master 210 and the ranging value of the slave 210 satisfies the designated condition. On the other hand, the master 210 generates the second candidate for correspondence information by encrypting information indicating that none of the ranging value of the mater 210 and the ranging value of the slave 210 satisfies the designated condition. Next, the master 210 performs the ranging process and receives the distance-related information from the slave 210. Subsequently, the master 210 transmits the second candidate for correspondence information as the correspondence information in the case where none of the ranging value of the master 210 and the ranging value of the slave 210 satisfies the designated condition.

Such a configuration makes it possible to shorten time taken to perform the ranging process and time from reception of the distance-related information to transmission of the correspondence information, because the candidates for correspondence information have already been generated before the ranging process and reception of the distance-related information. This makes it possible to improve responsiveness of the second authentication process.

On the other hand, the control device 220 may previously generate candidates for correspondence information to be received from the master 210. Next, the control device 220 may authenticate the portable device 100 in accordance with a result of comparing the generated candidates for correspondence information with the correspondence information received from the master 210. For example, the control device 220 previously generates a first candidate and a second candidate for the correspondence information. Next, the control device 220 determines whether or not the ranging value of the master 210 and the ranging value of the slave 210 satisfy the designated condition on the basis of whether the correspondence information received from the master 210 matches the first candidate or the second candidate. Such a configuration allows the control device 220 to determine whether or not the ranging value of the master and the ranging value of the slave 210 satisfy the designated condition without decrypting the encrypted correspondence information. This makes it possible to shorten time from when the control device 220 receives the correspondence information to when the control device 220 authenticates the portable device 100. This makes it possible to improve responsiveness of the second authentication process.

Figure 9:
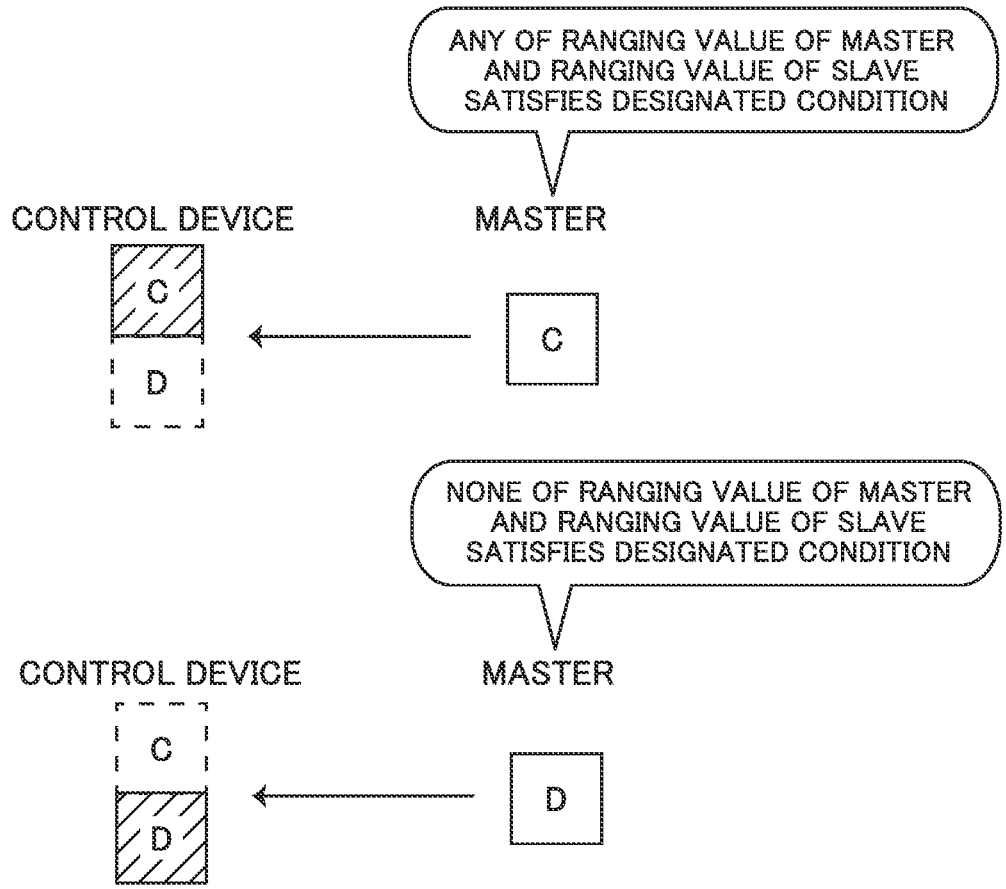
FIG. 9 is a diagram illustrating an example of a flow of information between the master and the control device according to the embodiment.

Details thereof will be described with reference to FIG. 9. FIG. 9 is a diagram illustrating an example of a flow of information between the control device 220 and the master 210 according to the present embodiment. The master 210 previously generates correspondence information "C" and correspondence information "D" as candidates for correspondence information. The correspondence information "C" is information obtained by encrypting information indicating that any of the ranging value of the master 210 and the ranging value of the slave 210 satisfies the designated condition. In other words, the correspondence information "C" is the first candidate for correspondence information. On the other hand, the correspondence information "D" is information obtained by encrypting information indicating that none of the ranging value of the mater 210 and the ranging value of the slave 210 satisfies the designated condition. In other words, the correspondence information "D" is the second candidate for correspondence information. In a similar way, the control device 220 previously generates the correspondence information "C" and the correspondence information "D" as the candidates for correspondence information.

The master 210 performs the ranging process, receives the distance-related information from the slave 210, and then transmits a candidate for correspondence information corresponding to the ranging value of the master 210 and the ranging value of the slave 210. Specifically, as illustrated in the top of FIG. 9, the master 210 transmits the correspondence information "C" in the case where any of the ranging value of the master 210 and the ranging value of the slave 210 satisfies the designated condition. On the other hand, as illustrated in the bottom of FIG. 9, the master 210 transmits the correspondence information "D" in the case where none of the ranging value of the master 210 and the ranging value of the slave 210 satisfies the designated condition.

The control device 220 compares the previously generated correspondence information "C" and correspondence information "D" with the correspondence information received from the master 210. Next, as illustrated in the top of FIG. 9, the control device 220 determines that any of the ranging value of the master 210 and the ranging value of the slave 210 satisfies the designated condition in the case where the previously generated correspondence information "C" matches the correspondence information received from the master 210. On the other hand, as illustrated in the bottom of FIG. 9, the control device 220 determines that none of the ranging value of the master 210 and the ranging value of the slave 210 satisfies the designated condition in the case where the previously generated correspondence information "D" matches the correspondence information received from the master 210.

However, in the case where the received distance-related information is invalid, the master 210 transmits information indicating that the received distance-related information is invalid, as the correspondence information. For example, when the received distance-related information is invalid, the candidates for distance-related information that the master 210 has previously generated do not match the distance-related information received from the slave 210. Such invalid distance-related information may be received in the case where there is an error in communication between the slave 210 and the portable device 100, or in the case where there is an error in communication between the master 210 and the slave 210. In this respect, such a configuration allows the control device 220 to detect the abnormality in the communication.

In addition, such invalid distance-related information may be received in the case where a malicious third person tries to impersonate a legitimate user. Therefore, the control device 220 may determine that authentication of the portable device 100 is failed in the case where the correspondence information indicates that the distance-related information is invalid. Such a configuration makes it possible to improve security.

Figure 10:
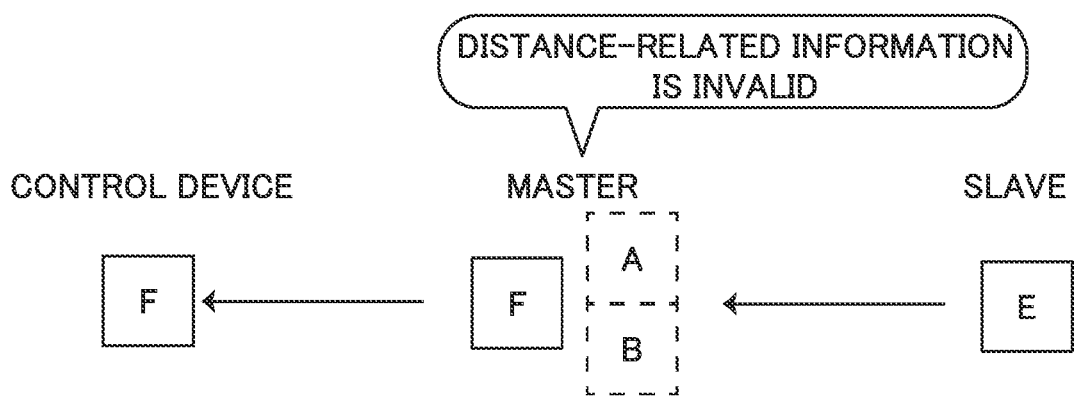
FIG. 10 is a diagram illustrating an example of a flow of information in the communication unit according to the embodiment.

Details thereof will be described with reference to FIG. 10. FIG. 10 is a diagram illustrating an example of a flow of information in the communication unit 200 according to the present embodiment. As described with reference to FIG. 8, the master 210 previously generates distance-related information "A" and distance-related information "B" as candidates for distance-related information to be received from the slave 210. The distance-related information "A" is information obtained by encrypting information indicating that a ranging value satisfies the designated condition. On the other hand, the distance-related information "B" is information obtained by encrypting information indicating that a ranging value does not satisfy the designated condition. It is assumed that the master 210 receives invalid distance-related information "E" from the slave 210. In this case, the master 210 determines that none of the previously generated distance-related information "A" and distance-related information "B" matches the distance-related information "E" received from the slave 210. Next, the master 210 transmits information "F" indicating that the distance-related information received from the slave 210 is invalid, as the correspondence information.

Note that, the master 210 may transmit information indicating that the received distance-related information is invalid, as the correspondence information in addition to the information indicating whether or not a ranging value of the master 210 and a ranging value of a normal slave 210 satisfy the designated condition. The normal slave 210 is a slave 210 that has transmitted proper distance-related information. For example, in the examples illustrated in FIG. 8 to FIG. 10, the master 210 may transmit a set of "C" and "F" or a set of "D" and "F" as the correspondence information. Such a configuration allows the control device 220 to authenticate the portable device 100 on the basis of ranging values other than a ranging value of an abnormal slave 210.

(3) Conclusion

A table 1 listed below shows the above-described relations among correspondence information reported by the control device 220, ranging values of the master 210, and ranging values of the slave 210.

TABLE 1

Relations among Correspondence Information, Ranging Values of Master, and Ranging Values of Slave

| Correspondence Information | Ranging Value of Master | Ranging Value of Slave |
|---|---|---|
| Satisfied (Correspondence Information: C) | Satisfied | Satisfied |
| | Satisfied | Unsatisfied |
| | Unsatisfied | Satisfied |
| Unsatisfied (Correspondence Information: D) | Unsatisfied | Unsatisfied |
| Satisfied but Invalid (Correspondence Information: C and F) | Satisfied | Invalid |
| Unsatisfied and Invalid (Correspondence Information: D and F) | Unsatisfied | Invalid |

With reference to the table 1, the wording "Satisfied" in the column "Ranging Value of Slave" means that a ranging value of the slave 210 satisfies the designated condition. The wording "Unsatisfied" in the column "Ranging Value of Slave" means that a ranging value of the slave 210 does not satisfy the designated condition. The wording "Invalid" in the column "Ranging Value of Slave" means that distance-related information that the master 210 has received from the slave 210 is invalid. The wording "Satisfied" in the column "Ranging Value of Master" means that a ranging value of the master 210 satisfies the designated condition. The wording "Unsatisfied" in the column "Ranging Value of Master" means that a ranging value of the master 210 does not satisfy the designated condition.

The wording "Satisfied" in the column "Correspondence Information" means that the correspondence information is information indicating that any of the ranging value of the master 210 and the ranging value of the slave 210 satisfies the designated condition. As shown in the table 1 listed above, the wording "Satisfied" appears in the column "Correspondence Information" if the wording "Satisfied" appears in any of the column "Ranging Value of Master" or the column "Ranging Value of Slave". In other words, the wording "Satisfied" in the column "Correspondence Information" corresponds to the correspondence information "C" illustrated in the top of FIG. 9.

The wording "Unsatisfied" in the column "Correspondence Information" means that the correspondence information is information indicating that none of the ranging value of the master 210 and the ranging value of the slave 210 satisfies the designated condition. As shown in the table 1 listed above, the wording "Unsatisfied" appears in the column "Correspondence Information" if the wording "Unsatisfied" appears in both the column "Ranging Value of Master" and the column "Ranging Value of Slave". The wording "Unsatisfied" in the column "Correspondence Information" corresponds to the correspondence information "D" illustrated in the bottom of FIG. 9.

The wording "Invalid" in the column "Correspondence Information" means that the correspondence information is information indicating that the distance-related information of the slave 210 is invalid. The correspondence information may include information indicating whether or not the ranging value of the master and the ranging value of the normal slave 210 satisfy the designated condition in addition to information indicating that the distance-related information of the slave 210 is invalid. The wording "Satisfied but Invalid" in the column "Correspondence Information" corresponds to the correspondence information "C" illustrated in the top of FIG. 9 and the correspondence information "F" illustrated in FIG. 10. The wording "Unsatisfied and Invalid" in the column "Correspondence Information" corresponds to the correspondence information "D" illustrated in the bottom of FIG. 9 and the correspondence information "F" illustrated in FIG. 10.

(4) Flow of Process

Next, with reference to FIG. 11, a flow of a process related to communication performed within the communication unit 200 in the second authentication process will be described. FIG. 11 is a sequence diagram illustrating a detailed example of a flow of the second authentication process performed by the communication unit 200 according to the present embodiment. As illustrated in FIG. 11, the control device 220, the master 210A, the slave 210B, and the portable device 100 are involved in this sequence. It is assumed that the only one slave 210 is involved in this sequence.

First, the slave 210B generates candidates for distance-related information (Step S402). For example, the slave 210B generates the first candidate for distance-related information by encrypting information indicating that a ranging value of the slave 210B satisfies the designated condition. In addition, the slave 210B generates the second candidate for distance-related information by encrypting information indicating that the ranging value of the slave 210B does not satisfy the designated condition.

In a similar way, the master 210A generates candidates for distance-related information (Step S404).

In addition, the master 210A generates candidates for correspondence information (Step S406). For example, the master 210A generates the first candidate for correspondence information by encrypting information indicating that any of the ranging value of the master 210A and the ranging value of the slave 210C satisfies the designated condition. In addition, the master 210 generates the second candidate for correspondence information by encrypting information indicating that none of the ranging value of the mater 210A and the ranging value of the slave 210B satisfies the designated condition.

In a similar way, the control device 220 generates candidates for correspondence information (Step S408).

Next, the master 210A and the slave 210B perform the ranging process with regard to the portable device 100 (Step S410). Therefore, the master 210A and the slave 210B acquires results of measuring the respective distances to the portable device 100, as the ranging values.

Next, the master 210A determines whether or not the ranging value obtained by the master 210A satisfies the designated condition (Step S412). In the case where it is determined that the ranging value obtained by the master 210A satisfies the designated condition (YES in Step S412), the master 210A transmits the first candidate for correspondence information, which is correspondence information indicating that the ranging value satisfies the designated condition (Step S414).

On the other hand, in the case where it is determined that the ranging value obtained by the master 210A does not satisfy the designated condition (NO in Step S412), the master 210A waits for distance-related information to be transmitted from the slave 210B. Next, the slave 210B determines whether or not the ranging value obtained by the slave 210B satisfies the designated condition (Step S416).

In the case where it is determined that the ranging value obtained by the slave 210B satisfies the designated condition (YES in Step S416), the slave 210B transmits the first candidate for distance-related information, which is distance-related information indicating that the ranging value satisfies the designated condition (Step S418). Next, the master 210A transmits the first candidate for correspondence information, which is correspondence information indicating that the ranging value satisfies the designated condition, as correspondence information corresponding to the distance-related information received from the slave 210B (Step S420). Specifically, the master 210A transmits the first candidate for correspondence information indicating that the ranging value satisfies the designated condition, because the received distance-related information matches the first candidate for distance-related information indicating that the ranging value satisfies the designated condition.

On the other hand, in the case where it is determined that the ranging value obtained by the slave 210B does not satisfy the designated condition (NO in Step S416), the slave 210B transmits the second candidate for distance-related information, which is distance-related information indicating that the ranging value does not satisfy the designated condition (Step S422). Next, the master 210A transmits the second candidate for correspondence information, which is correspondence information indicating that the ranging value does not satisfy the designated condition, as correspondence information corresponding to the distance-related information received from the slave 210B (Step S424). Specifically, the master 210A transmits the second candidate for correspondence information indicating that the ranging value does not satisfy the designated condition, because the received distance-related information matches the second candidate for distance-related information indicating that the ranging value does not satisfy the designated condition.

Next, the control device 220 authenticates the portable device 100 on the basis of the received correspondence information (Step S426). Specifically, the control device 220 determines that the portable device 100 is successfully authenticated in the case where the received correspondence information matches the first candidate for correspondence information indicating that the ranging value satisfies the designated condition. On the other hand, the control device 220 determines that authentication of the portable device 100 is failed in the case where the received correspondence information matches the second candidate for correspondence information indicating that the ranging value does not satisfy the designated condition.

3. Supplement

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

For example, with reference to the above-described embodiment, the technical features related to communication within the communication unit 200 based on the third connection configuration have been described above. A similar technology is also applicable to other connection configurations.

For example, each of the plurality of communication devices 210 may encrypt and transmit the distance-related information. Such a configuration makes it possible to improve security.

For another example, each of the plurality of communication devices 210 may previously generate candidates for information indicating whether or not a distance to the portable device 100 satisfies the designated condition, and may transmit a candidate corresponding to a distance calculated through the ranging process (that is, ranging value), as the distance-related information. Specifically, each of the plurality of communication devices 210 generates information obtained by encrypting information indicating that a ranging value satisfies the designated condition, and information obtained by encrypting information indicating that a ranging value does not satisfy the designated condition, as the candidates for distance-related information. Next, each of the plurality of communication devices 210 transmits a candidate corresponding to a ranging value obtained through the ranging process. Such a configuration makes it possible to shorten time from the ranging process to transmission of the distance-related information, because the distance-related information has already been generated before the ranging process. This makes it possible to improve responsiveness of the second authentication process.

In this case, the control device 220 may previously generate candidates for the distance-related information. Next, the control device 220 may authenticate the portable device 100 in accordance with a result of comparing the generated candidates for distance-related information with respective pieces of distance-related information received from the plurality of communication devices 210. For example, the control device 220 previously generates the first candidate and second candidate for distance-related information. Next, the control device 220 determines whether or not respective ranging values of the plurality of communication devices 210 satisfy the designated condition on the basis of whether the respective pieces of distance-related information received from the plurality of communication devices 210 match the first candidate or the second candidate. Such a configuration allows the control device 220 to determine whether or not the ranging values of the communication devices 210 satisfy the designated condition without decrypting the encrypted distance-related information. This makes it possible to shorten time from when the control device 220 receives the distance-related information to when the control device 220 authenticates the portable device 100. Accordingly, it is possible to improve responsiveness of the second authentication process.

In addition, for example, although the example in which the portable device 100 serves as the authenticatee and the control unit 200 serves as the authenticator has been described in the above embodiment, the present invention is not limited thereto. The roles of the portable device 100 and the communication unit 200 may be reversed, or the roles may be switched dynamically. In addition, the ranging and authentication may be performed between the communication units 200.

In addition, for example, although the example in which the present invention is applied to the smart entry system has been described in the above embodiment, the present invention is not limited thereto. The present invention is applicable to any system that performs the ranging and authentication by transmitting/receiving signals. For example, the present invention is applicable to a pair of any two devices selected from a group including portable devices, vehicles, smartphones, drones, houses, home appliances, and the like. In this case, one in the pair operates as the authenticator, and the other in the pair operates as the authenticatee. Note that, the pair may include two device of a same type, or may include two devices of different types.

In addition, for example, in the above embodiment, the standard using the UHF/LF has been exemplified as the first wireless communication standard, and the standard using the UWB has been exemplified as the second wireless communication standard. However, the present invention is not limited thereto. For example, it is also possible to use Wi-Fi (registered trademark), Bluetooth (registered trademark), or the like as the first wireless communication standard. In addition, for example, a standard using infrared may be used as the second wireless communication standard.

In addition, for example, although the above embodiment has been described on the assumption that the communication unit 200 is installed in the vehicle 202, the present invention is not limited thereto. For example, a portion or all of the communication unit 200 may be prepared as a separate object from the vehicle 202. For example, the communication unit 200 may be installed in a parking space or the like for the vehicle 202. In this case, the communication unit 200 may wirelessly transmit a control signal to the vehicle 202 on the basis of a result of communication with the portable device 100 and may remotely control the vehicle 202.

Note that, a series of processes performed by the devices described in this specification may be achieved by any of software, hardware, and a combination of software and hardware. A program that configures the software is stored in advance in, for example, a recording medium (non-transitory medium) installed inside or outside the devices. In addition, for example, when a computer executes the programs, the programs are read into random access memory (RAM), and executed by a processor such as a CPU. The recording medium may be a magnetic disk, an optical disc, a magneto-optical disc, flash memory, or the like, for example. Alternatively, the above-described computer program may be distributed via a network without using the recording medium, for example.

Further, in the present specification, the processes described using flowcharts and sequence diagrams are not necessarily executed in the order illustrated in the drawings. Some processing steps may be executed in parallel. In addition, additional processing steps may be employed and some processing steps may be omitted.

REFERENCE SIGNS LIST

1 system
100 portable device
110 wireless communication section
120 storage section
130 control section
200 communication unit
202 vehicle
210 communication device
211 wireless communication section
212 intra-unit communication section
213 storage section
214 control section
220 control device
221 wireless communication section
222 intra-unit communication section
223 storage section
224 control section

What is claimed is:

1. An authentication system comprising:
a plurality of communication devices; and
a control device configured to execute a process on a basis of information obtained through wireless communication between the respective communication devices and other communication device that is different from the plurality of communication devices,
wherein each of the plurality of communication devices includes a wireless communication section configured to perform wireless communication with the other communication device, and
the control device determines that the other communication device is successfully authenticated in a case where any one of a plurality of pieces of information regarding distances between the respective communication devices and the other communication device satisfies a designated condition on a basis of the pieces of information regarding the distances obtained through the wireless communication between the respective communication devices and the other communication device,
wherein the control device determines that authentication of the other communication device is failed in a case where all the pieces of information regarding the distances do not satisfy the designated condition, and
wherein
the plurality of communication devices includes a first communication device and one or more second communication devices,
each of the one or more second communication devices is connected to the first communication device, and transmits the information regarding the distance, and
the first communication device is connected to the control device and the one or more second communication devices, and transmits correspondence information that is information corresponding to at least any of information regarding the distance obtained by the first communication device and information regarding the respective distances received from the one or more second communication devices.

2. The authentication system according to claim 1, wherein
the information regarding the distances is the distances,
the plurality of communication devices calculates the respective distances, and
the control device determines whether or not the distances satisfy the designated condition, and determines whether or not the other communication device is successfully authenticated.

3. The authentication system according to claim 1, wherein
the information regarding the distances is time lengths to be used for calculating the distances,
the plurality of communication devices acquires the respective time lengths, and
the control device calculates the distances on the basis of the time lengths, determines whether or not the calculated distances satisfy the designated condition, and determines whether or not the other communication device is successfully authenticated.

4. The authentication system according to claim 1, wherein
the information regarding the distances is times to be used for calculating the distances,
the plurality of communication device acquires the respective times, and
the control device acquires time lengths to be used for calculating the distances on the basis of the times, calculates the distances on the basis of the time lengths, determines whether or not the calculated distances satisfy the designated condition, and determines whether or not the other communication device is successfully authenticated.

5. The authentication system according to claim 1, wherein
the information regarding the distances is information indicating whether or not the distances satisfy the designated condition,
the plurality of communication devices calculates the respective distances and determines whether or not the respective distances satisfy the designated condition, and
the control device determines whether or not the other communication is successfully authenticated on a basis of the information indicating whether or not the distances satisfy the designated condition.

6. The authentication system according to claim 1, wherein
the information regarding the distance is information indicating whether or not the distance satisfies the designated condition, and
the first communication device transmits information indicating whether or not the distance of any of the plurality of communication devices satisfies the designated condition, as the correspondence information.

7. The authentication system according to claim 6, wherein
the first communication device calculates the distance before receiving the information regarding the distance from the second communication device, and
the first communication device transmits information indicating that the distance satisfies the designated condition, as the correspondence information in the case where the calculated distance satisfies the designated condition.

8. The authentication system according to claim 6, wherein the second communication device previously generates candidates for the information indicating whether or not the distance satisfies the designated condition, and transmits a candidate corresponding to the calculated distance, as the information regarding the distance.

9. The authentication system according to claim 6, wherein the first communication device previously generates candidates for the correspondence information, and transmits a candidate corresponding to the information regarding the distance received from the second communication device and the calculated distance, as the correspondence information.

10. The authentication system according to claim 9, wherein the first communication device previously generates candidates fir the information regarding the distance, and transmits the correspondence information in accordance with a result of comparing the generated candidates with the information regarding the distance received from the second communication device.

11. The authentication system according to claim 9, wherein the control device previously generates candidates for the correspondence information, and authenticates the other communication device in accordance with a result of comparing the generated candidates with the correspondence information received from the first communication device.

12. The authentication system according to claim 1, wherein, in a case where the received information regarding the distance is invalid, the first communication device transmits information indicating that the received information regarding the distance is invalid, as the correspondence information.

13. The authentication system according to claim 1, wherein
the first communication device encrypts and transmits the correspondence information, and
the one or more second communication devices encrypts and transmits the information regarding the respective distances.

14. The authentication system according to claim 1, wherein, the respective communication devices are connected to the control device and the plurality of communication devices transmits the information regarding the distances, at respective timings that are previously allocated to the plurality of communication devices or after carrier sensing is carried out to check an available communication path to the control device.

15. The authentication system according to claim 14, wherein each of the plurality of communication devices previously generates candidates for the information indicating whether or not the distance satisfies the designated condition, and transmits a candidate corresponding to the calculated distance as the information regarding the distance.

16. The authentication system according to claim 15, wherein the control device previously generates candidates for the information regarding the distances and authenticates the other communication device in accordance with a result of comparing the generated candidates with the pieces of information regarding the respective distances received from the plurality of communication devices.

17. The authentication system according to claim 14, wherein the plurality of communication devices encrypt and transmits the information regarding the respective distances.

18. An authentication method comprising:
providing a plurality of communication devices each including a wireless communication section configured to perform wireless communication with the other communication device;
executing a process on a basis of information obtained through wireless communication between the respective communication devices and other communication device that is different from the plurality of communication devices; and
determining that the other communication device is successfully authenticated in a case where any one of a plurality of pieces of information regarding distances between the respective communication devices and the other communication device satisfies a designated condition on a basis of the pieces of information regarding the distances obtained through the wireless communication between the respective communication devices and the other communication device, and wherein
the plurality of communication devices includes a first communication device and one or more second communication devices,
each of the one or more second communication devices is connected to the first communication device, and transmits the information regarding the distance, and
the first communication device is connected to the control device and the one or more second communication devices, and transmits correspondence information that is information corresponding to at least any of information regarding the distance obtained by the first communication device and information regarding the respective distances received from the one or more second communication devices.

* * * * *